Figure 1:
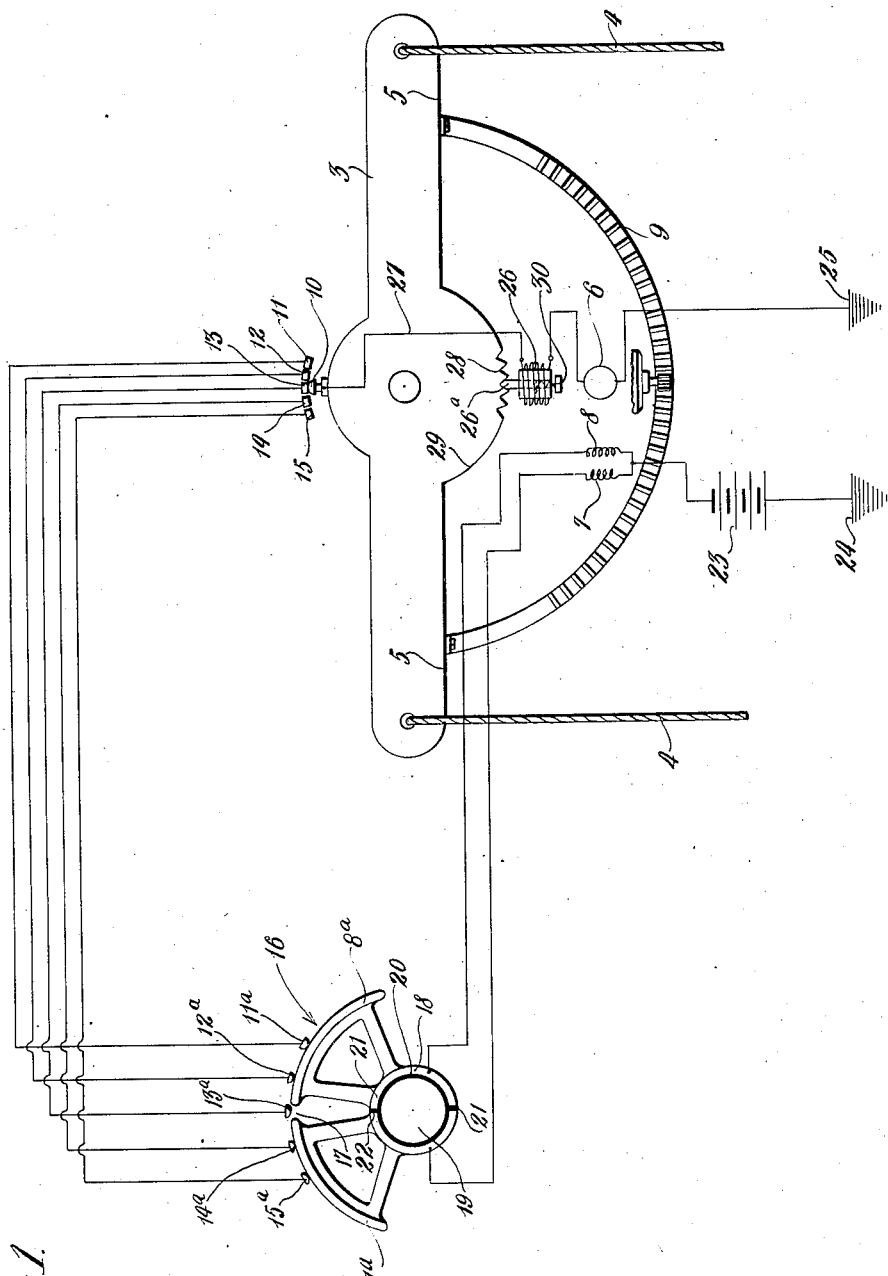

Dec. 8, 1925.

W. H. McMULLEN 1,564,872

AIRCRAFT CONTROL

Filed Dec. 19, 1922

2 Sheets-Sheet 1

Inventor
WILLIAM H McMULLEN
By his Attorney

Dec. 8, 1925.
W. H. McMULLEN
1,564,872
AIRCRAFT CONTROL
Filed Dec. 19, 1922
2 Sheets-Sheet 2
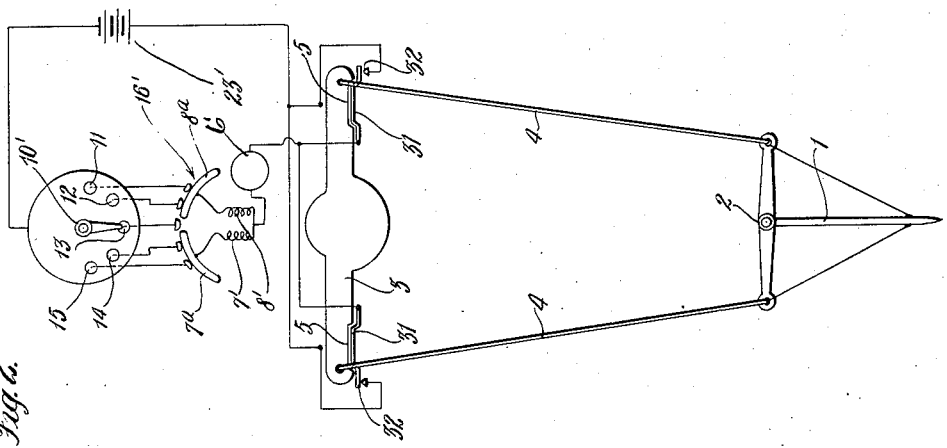
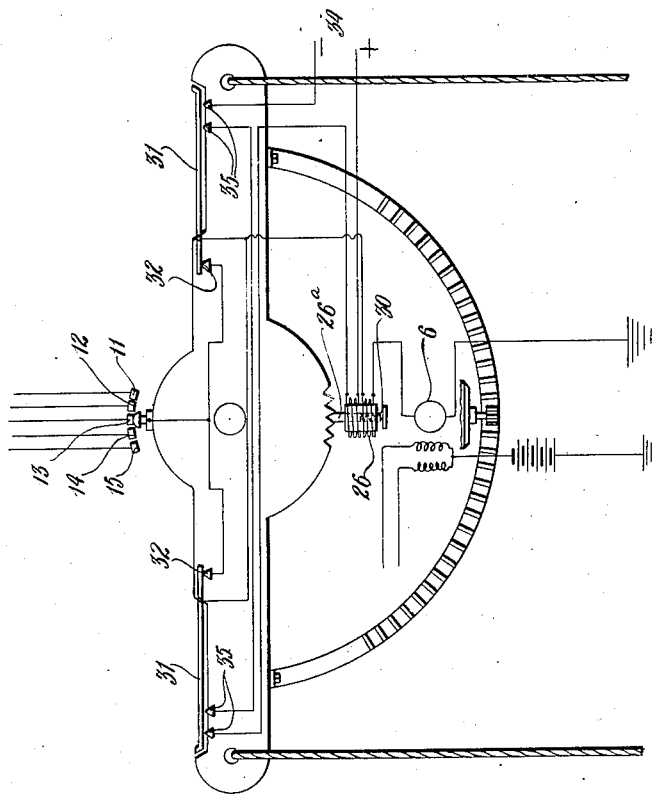
Inventor
WILLIAM H. McMULLEN
By his Attorney Chas. H. Keel Patented Dec. 8, 1925.

1,564,872

UNITED STATES PATENT OFFICE.

WILLIAM H. McMULLEN, OF HEMPSTEAD, NEW YORK.

AIRCRAFT CONTROL.

Application filed December 19, 1922. Serial No. 607,918.

*To all whom it may concern:*

Be it known that I, WILLIAM H. MCMULLEN, a citizen of the United States, residing at Hempstead, in the county of Nassau and State of New York, and whose post-office address is 162 North Franklin Street, Hempstead, Long Island, New York, have invented new and useful Improvements in Aircraft Controls, of which the following is a specification.

This invention relates to aircraft and particularly to control-devices and systems therefor.

The object of the invention generally stated is a control system whereby the pilot may readily effect the steering and maneuvering of the craft either directly or indirectly, as the occasion demands, or as it is desired. To this end I have provided a control system whereby the pilot may effectively control the craft from any desirable point on the craft frame work, or he may render inoperative the controlling mechanism and proceed to control the craft directly by hand or foot operation, or he may use these controls in conjunction. A further object of the invention is a control system wherein the direct control may be rendered inoperative by the mere act of the pilot in resuming his hand or foot control, and preferably the indirect control may be rendered inoperative only by bringing both feet or hands into engagement with corresponding control means. A further object of the invention is a control system, enabling the control devices to be set and locked in any one position in order to relieve the pilot of the fatigue of constant attention on extended flights. My invention also contemplates means operatively associated with the control devices for rendering inoperative the locking mechanism and vice versa, and also means whereby the aircraft control element is brought to a position corresponding to the position of the hand control element whenever the direct actuation control is discontinued. My control system is characterized, also, by correlated devices of simple construction, easy installation and manipulation.

For a better understanding of the above indicated novel features of my invention and others which will hereinafter appear, reference may be had to the accompanying drawings forming a part of this application wherein Fig. 1 is a diagrammatic view of my novel control system, Fig. 2 is a slight modification thereof, and Fig. 3 is a still further modification diagrammatically illustrated.

Referring to the drawing where like numerals designate similar parts throughout, I have indicated in a conventional manner, the rudder 1 of an aeroplane or other aircraft which is to be operated about the pivot 2 either alone or in conjunction with the other aeroplane controls to effect a proper steering movement of the craft. This rudder 1 is operatively connected with a conventional rudder bar 3 by means of operating connections 4, here illustrated as of the conventional tie rope or cord. This rudder bar 3 may be operated by the pilot in the usual manner by engaging the ends 5 thereof with the feet.

For the purpose of providing an independent and indirect control, I have illustrated a driving motor 6 which may be a reversible motor of any desired type, but preferably of the electrical type, having a pair of series field coils 7 and 8, the energizing of which determines the direction of rotation of the motor armature 6. The motor armature 6 is geared to a segment 9 which is either carried by or otherwise operatively connected with the rudder bar 3 so that when the motor armature 6 is operated the rudder bar 3 together with the rudder 1 are actuated thereby in one direction or the other, depending upon the direction of rotation of the armature 6. The rudder bar 3 also carries a contact member 10 which contacts with one of a multiplicity of co-operating contact segment 11, 12, 13, 14 and 15 depending upon the position of the rudder bar 3. At 16 I have illustrated a hand control switch which comprises two separate switches 7$^a$ and 8$^a$ in the form of segmental metallic members, separated at the point 17 so as to clear in the various positions one of the contacts 11$^A$, 12$^A$, 13$^A$, 14$^A$ and 15$^A$, this switch 16 being adapted to connect in circuit with the series fields 7 and 8 all of these latter contacts except one. In the position shown the contact 13$^A$ is the one which is in open circuit. The contacts 11 to 15 inclusive are connected respectively to the contacts 11$^A$ to 15$^A$, inclusive, through the circuits illustrated. The segmental switch 16 is conventionally illustrated as formed on a metallic sleeve 18 the latter being mounted on and insulated from a shaft 19, an insulating shell 20 being disposed about the shaft 19. The sleeve 18 is divided at the points 21 and 22 and suitably insulated at these points to electrically isolate the switch segments 7ª and 8ª, the arrangement being such that these contact segments move together when operated. The contact segments 7^A and 8^A are connected directly through the circuits shown respectively with one end of the series field coils 7 and 8, the other end of the field coils 7 and 8 being joined to a common conductor leading to a suitable source of electric power, as, for example, a battery 23 which is illustrated as connected to the ground at 24.

The armature 6 has one side also connected to the ground at 25 and its other side leads through an electromagnetic coil 26 and thence through connection 27 to the contact element 10. The electromagnetic coil 26 is provided with a core 26^A which has a detent or dog formed at the end thereof for engaging any one of a multiplicity of ratchet teeth 28 formed in a semi-circular member 29 on the rudder bar 3. The armature 26^A is normally urged into engagement with one of the ratchet teeth 28 by means of a spring 30, but the tension of the latter may be overcome and the armature withdrawn by the energization of the coil 26 which is in series with the motor armature 6.

The operation of the system shown in Fig. 1 is as follows:

The position illustrated indicates the adjusted or running position of the controls. When it is desired to shift the controls, as, for example, to shift the rudder, the ailerons or the elevators, the contact switch 16 is shifted either to the left or right, depending upon the direction of movement desired, to complete the circuit of the cooperating contact which is out of circuit, as, for example, in position shown the contact 13^A. The closure of the contact 13^A at switch 16 closes the circuit from the battery 23 through one of the series field coils 7 or 8 depending upon the direction of movement of the switch 16, thence through the segmental switch 7^A (or 8^A), contact 13^A, through the corresponding contact 13, through the contact switch 10, through the electromagnet 26, through the armature 6 and thence to the ground. This causes the electromagnet 26 to withdraw the core 26^A from the ratchet 28 and the motor armature 6 is energized and driven in a direction corresponding to the direction of movement of the segment switch 16 and the field coil which is energized. This operates the rudder bar 3 and connected control element till the contact element 10 engages a contact which corresponds to the out-of-circuit contact of the switch 16, at which point the operation is discontinued and the controls are locked in the actuated position until the switch 16 is again operated, or the locking means otherwise rendered inoperative. If it is desired to operate the controls in the reverse direction, the switch 16 is moved in the opposite direction relatively to the former movement of the shaft 19 and the contact switch 16 to connect in circuit the series field coil which was not connected in before, thereby reversing the motor and operating the controls in the opposite direction. If desired, the control switch 16 may be adjacent to the point where the rudder bar is located so that the pilot may, at the same time that he is operating the switch 16 with his hand, use his feet to assist in operating the rudder bar 3. The electromagnet 26 effects the automatic locking of the control elements in the actuated position. The controls are indicated as effecting operation of the rudder bar only, but it is understood that similar controls may be provided for the lateral or the longitudinal balance if desired.

In Fig. 2, I have indicated the control switches as 10' and 16', but it is understood that they are similar to switches 10 and 16 of Fig. 1, switch 10' following the movements of the rudder bar and switch 16' being actuated either directly or indirectly by hand. I have illustrated here the contact segments 7^A and 8^A which lead to the series fields 7' and 8' and are adapted to be connected alternately in circuit depending upon the direction of movement thereof. I have indicated in Fig. 2, an arrangement wherein the pilot, by merely putting his feet against the ends 5 of the rudder bar 3 thereof, engages the switch elements 31 to interrupt the operating circuit at the points 32 and thereby render inoperative the indirect or motor power control. The arrangement is such that if either of the switches 31 is closed, the motor armature 6' is connected in circuit for operating the controls so that it is necessary for both feet to be in engagement with the rudder bar 3 in order to render inoperative the motor control. In the control indicated in Fig. 2 it is desirable to either omit the automatic locking mechanism 26 and 26^A, shown in Fig. 1, altogether, or to provide some means for automatically releasing the detent 26^A when the motor circuit is interrupted at points 32 for operation by foot. In the automatic releasing mechanism, as illustrated in Fig. 3, the armature core 26^A is provided with an auxiliary coil 33 which is automatically connected in circuit with a source of electric power 34 when the switches 31 are engaged to interrupt the control and power circuit at the points 32. This is effected through means of two pairs of contacts 35 and 36 which are connected in series with the auxiliary coil 33 and the source of current 34 so that when both of the switches 31 are pressed down upon the contacts 35 and 36 the auxiliary coil 33 is energized to withdraw the detent 26^A and thereby permit the hand or foot operation of the rudder bar or other control element when the operating circuit for the control mechanism is rendered inoperative. The switch 16 and its cooperating parts illustrated in Fig. 1 is omitted in Fig. 3 for convenience in illustration and the operation for indirect or motor control in Figs. 2 and 3 is similar to that described in connection with Fig. 1. When it is desired to render inoperative the motor control, and control the craft in the ordinary manner, it is only necessary to press down upon the switch elements 31 which automatically effects this function.

It is observed that after the power control has been rendered inoperative in any position of the hand switch by engaging and actuating the rudder bar directly with the feet, upon release of the rudder bar it is automatically returned to the initial position, unless the position of the hand switch has been changed in the meantime, in which latter case the released rudder bar will be returned to a position where switch 10 is on a contact (11, 12, 13, 14, 15) corresponding to the out-of-circuit contact on switch 16. For example, in Fig. 3, if the rudder bar has been moved by the feet in either direction from the middle position, the release of the same and the consequent closure of the power circuit at points 32 will result in the return of the bar to the neutral or middle position, the desired series coil 7 or 8 being energized to effect the desired operation of the motor to bring the rudder bar back to the initial position. Each of the segmental switches 7^a and 8^a should preferably be large enough to close or engage all of the contacts 11^a to 15^a inclusive.

The drawings are diagrammatic for convenience and facility in explaining the principles of my invention. I have illustrated the switches 10 and 16 as having only five control points, whereas, in practice it may be desirable to have many more points of control in order to provide the desired sensitiveness and range of control in the particular application. The control is set forth as effecting operation of the rudder, whereas, the principles are equally applicable to the longitudinal and lateral balance when such control devices are desired. The invention is particularly useful in large ships wherein the manipulation of the controls is a more or less difficult and tedious problem due to the resistance to movement encountered. The locking features are desirable in long flights, giving the pilot an opportunity to rest and free him from the fatigue often experienced in long flights due to constant attention to the craft.

I claim:

1. In a control system for aircraft, the combination with an aircraft control element to be actuated, of an electric motor operatively connected thereto, an electric switch operated in unison with the control element, a hand control switch controlling the circuit from the motor through said first named switch, a device including means for rendering inoperative the motor circuit whereby the control element may be actuated directly, and connections between the motor and the switches for insuring the return of the device to a position corresponding to the position of the hand control switch after the direct actuation of the control element and the restoration of the motor control.

2. In a control system for aircraft the combination with an aircraft control element to be actuated to any one of a multiplicity of positions in opposite directions from a neutral position, of a power motor for actuating said element in either direction, a hand control member for effecting the operation of said power motor and selecting a point on either side of the neutral position to which the element is to be actuated, a device for actuating the element directly and independently of the power motor and means insuring the return of the aircraft element to the selected position corresponding to the position of the hand control member after the direct and independent actuation thereof and the release of the direct and independent actuating device.

3. In a control system for aircraft the combination with an aircraft control element to be actuated to any one of a plurality of positions in opposite directions from a neutral position, of a power motor for actuating said element in either direction, a hand control member and a member actuated by the element for effecting the operation of the power motor and selecting a definite point to which the element is to be actuated and where the operation of the element is to be arrested, a device for actuating the element directly and independently of the power motor and a control device associated with said direct actuating device for rendering inoperative the power motor while the direct and independent actuation is being effected, but cooperating with the aforesaid control members to insure the return of the element to the selected position corresponding to that determined by the hand control member after cessation of the independent actuating operation.

4. In a control system for aircraft of the character set forth in claim 3 wherein the device for actuating the element directly must be engaged at two different points to render inoperative the power motor and to actuate the element directly and independently of the power motor.

5. In a control system for aircraft the combination with an aircraft control element to be actuated to any one of a multiplicity of positions on either side of a neutral position, of an electric power motor for actuating said element in either direction, a circuit for said motor, a hand control member and a control member operated by the element for energizing said motor and selecting a position to which the element is to be actuated and there arrested, a device for actuating the element directly and independently of the power motor, a switch member also disposed in the control circuit and so associated with said device that the latter cannot be operated directly without breaking the motor circuit through the switch, the arrangement being such that upon the release of the direct acting device and its cooperative switch the aircraft element is automatically returned by the power motor to the selected position corresponding to that occupied by the hand control member.

6. In a control system for aircraft the combination with an aircraft control element to be actuated to any one of a multiplicity of positions in opposite directions from a neutral position, of locking means for positively locking the element in any position, a power motor for actuating said element in either direction, a hand control member for temporarily rendering inoperative the locking means, effecting the operation of said power motor and selecting a point on either side of the neutral position to which the element is to be actuated, a device for actuating the element directly and independently of the power motor and means insuring the return of the aircraft element to the selected position corresponding to the position of the hand control member after the direct and independent actuation thereof and the release of the direct and independent actuating device.

7. In a control system for aircraft the combination with an aircraft control element to be actuated to any one of a plurality of positions in opposite directions from a neutral position, of a power motor for actuating said element in either direction, locking means for positively locking the element in any position, a hand control member and a member actuated by the element for temporarily rendering inoperative the locking means, effecting the operation of the power motor and selecting a definite point to which the element is to be actuated and where the operation of the element is to be arrested, a device for actuating the element directly and independently of the power motor and a control device associated with said direct actuating device for rendering inoperative the power motor while the direct and independent actuation is being effected, but cooperating with the aforesaid control members to insure the return of the element to the selected position corresponding to that determined by the hand control member after cessation of the independent actuating operation.

8. In a control system for aircraft a combination with an aircraft control element to be actuated, a power motor for actuating said element, a control means for effecting the operation of said power motor, a member whereby the aircraft control element may be actuated directly by the pilot and independently of the power motor, together with devices associated with said member and cooperating with the control means, for rendering the power motor inoperative only when said member is engaged at two isolated points.

9. In a control system for aircraft, the combination with an aircraft control element to be actuated, of an electric motor operatively connected thereto, an electric switch operated in unison with the control element, a hand control switch controlling the circuit from the motor through said first named switch, a device whereby the control element may be actuated directly and independently of the motor, and connections between the motor and the switches for insuring the return of the control element to a definite position corresponding to the position of the hand control member after the direct and independent actuation of the control element.

In testimony whereof, I have signed my name to this specification.

WILLIAM H. McMULLEN.